US012159564B2

(12) United States Patent
Chen

(10) Patent No.: US 12,159,564 B2
(45) Date of Patent: Dec. 3, 2024

(54) PIXEL CIRCUIT AND DISPLAY PANEL HAVING GRAYSCALE ADJUSTMENT CIRCUIT WITH MULTIPLE PARALLEL GRAYSCALE ADJUSTMENT BRANCHES

(71) Applicant: TCL CHINA STAR OPTOELECTRONICS TECHNOLOGY CO., LTD., Guangdong (CN)

(72) Inventor: Weifeng Chen, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,478

(22) PCT Filed: Feb. 24, 2022

(86) PCT No.: PCT/CN2022/077690
§ 371 (c)(1),
(2) Date: Apr. 29, 2022

(87) PCT Pub. No.: WO2023/155226
PCT Pub. Date: Aug. 24, 2023

(65) Prior Publication Data

US 2024/0169876 A1 May 23, 2024

(30) Foreign Application Priority Data

Feb. 17, 2022 (CN) ......................... 202210145832.7

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0842* (2013.01); *G09G 2320/0233* (2013.01)

(58) Field of Classification Search
CPC ............... G09G 3/2007; G09G 3/3233; G09G 2300/0842; G09G 2320/0233; G09G 5/10; G09G 3/3266; G09G 3/3275
See application file for complete search history.

(56) References Cited

U.S. PATENT DOCUMENTS

2002/0011979 A1 1/2002 Nitta et al.
2006/0214895 A1* 9/2006 Shih .................... G09G 3/3696 345/88

(Continued)

FOREIGN PATENT DOCUMENTS

CN 101373583 A 2/2009
CN 102074207 A 5/2011

(Continued)

OTHER PUBLICATIONS

International Search Report in International application No. PCT/CN2022/077690, mailed on Apr. 26, 2022.

(Continued)

*Primary Examiner* — Richard J Hong
(74) *Attorney, Agent, or Firm* — PV IP PC; Wei Te Chung

(57) ABSTRACT

The present application provides a pixel circuit and a display panel. The pixel circuit includes a light-emitting element, a driving circuit, a grayscale adjustment circuit, and a control circuit. The driving circuit can provide a corresponding power supply voltage for the light-emitting element, and the control circuit can control at least one of at least two grayscale adjustment branches to be in a conductive state.

20 Claims, 2 Drawing Sheets

(56) References Cited

U.S. PATENT DOCUMENTS

| | | | | |
|---|---|---|---|---|
| 2009/0201275 A1* | 8/2009 | Bae | G09G 3/3275 345/208 |
| 2021/0335256 A1* | 10/2021 | Yin | G09G 3/3266 |
| 2023/0252956 A1* | 8/2023 | Kim | G09G 5/10 345/204 |

FOREIGN PATENT DOCUMENTS

| | | | |
|---|---|---|---|
| CN | 102682715 A | | 9/2012 |
| CN | 104637435 A | * | 5/2015 |
| CN | 105679250 A | | 6/2016 |

OTHER PUBLICATIONS

Written Opinion of the International Search Authority in International application No. PCT/CN2022/077690, mailed on Apr. 26, 2022.

* cited by examiner

PIXEL CIRCUIT AND DISPLAY PANEL HAVING GRAYSCALE ADJUSTMENT CIRCUIT WITH MULTIPLE PARALLEL GRAYSCALE ADJUSTMENT BRANCHES

BACKGROUND OF DISCLOSURE

Field of Disclosure

The present disclosure relates to the field of display technology, in particular to a pixel circuit and a display panel.

Description of Prior Art

In conventional display screen of spontaneous light type, color shift phenomenon occurs when grayscale changes. The prior art lacks a better and suitable dynamic dimming scheme, which tends to result in a technical problem of uneven brightness display.

SUMMARY OF DISCLOSURE

A pixel circuit and a display panel are provided to solve a technical problem that luminance display is not uniform due to dynamic dimming.

In a first aspect, the present disclosure provides a pixel circuit, comprising: a light-emitting element; a driving circuit; a grayscale adjustment circuit including at least two grayscale adjustment branches connected in parallel, wherein input terminals of the at least two grayscale adjustment branches are electrically connected to output terminals of the driving circuit, and output terminals of the at least two grayscale adjustment branches are electrically connected to the light-emitting element; and a control circuit, wherein output terminals of the control circuit are electrically connected to control terminals of the at least two grayscale adjustment branches for controlling turn-on and turn-off of the at least two grayscale adjustment branches respectively.

In some embodiments, the grayscale adjustment circuit comprises: a first grayscale adjustment branch, wherein an input terminal of the first grayscale adjustment branch is electrically connected to an output terminal of the driving circuit, an output terminal of the first grayscale adjustment branch is electrically connected to the light-emitting element, and a control terminal of the first grayscale adjustment branch is electrically connected to a first output terminal of the control circuit; and a second grayscale adjustment branch, wherein an input terminal of the second grayscale adjustment branch is electrically connected to the input terminal of the first grayscale adjustment branch, an output terminal of the second grayscale adjustment branch is electrically connected to the output terminal of the first grayscale adjustment branch, and a control terminal of the second grayscale adjustment branch is electrically connected to a second output terminal of the control circuit.

In some embodiments, the grayscale adjustment circuit further comprises a third grayscale adjustment branch connected to the first grayscale adjustment branch and the second grayscale adjustment branch, an input terminal of the third grayscale adjustment branch is electrically connected to the input terminal of the second grayscale adjustment branch, an output terminal of the third grayscale adjustment branch is electrically connected to the output terminal of the second grayscale adjustment branch, and a control terminal of the third grayscale adjustment branch is electrically connected to a third output terminal of the control circuit.

In some embodiments, each of the grayscale adjustment branches comprises a resistor and a transistor, one end of the resistor is electrically connected to an output terminal of the driving circuit, another end of the resistor is electrically connected to one of a source and a drain of the transistor, a gate of the transistor is electrically connected to a corresponding output terminal of the control circuit, and another one of the source and the drain of the transistor is electrically connected to the light-emitting element.

In some embodiments, the pixel circuit further comprises a voltage regulation circuit electrically connected to an output terminal of the driving circuit, an input terminal of the grayscale adjustment circuit, and the light-emitting element, and a control terminal of the voltage regulation circuit is electrically connected to the output terminal of the control circuit.

In some embodiments, the voltage regulation circuit comprises a boost branch and a clamp branch, an input terminal of the boost branch is electrically connected to the output terminal of the driving circuit, an output terminal of the boost branch is electrically connected to an input terminal of the clamp branch, and an output terminal of the clamp branch is electrically connected to an input terminal of the grayscale adjustment circuit.

In some embodiments, the boost branch comprises: a fourth transistor, wherein one of a source and a drain of the fourth transistor is electrically connected to the output terminal of the driving circuit and a gate of the fourth transistor is electrically connected to a fourth output terminal of the control circuit; a first inductor, wherein one end of the first inductor is electrically connected to another one of the source and the drain of the fourth transistor; a first diode, wherein an anode of the first diode is electrically connected to another end of the first inductor; a first capacitor, wherein one end of the first capacitor is electrically connected to a cathode of the first diode, and another end of the first capacitor is grounded; a sixth transistor, wherein one of a source and a drain of the sixth transistor is electrically connected to another end of the first inductor, another one of the source and the drain of the sixth transistor is grounded, and a gate of the sixth transistor is electrically connected to a seventh output of the control circuit; and a seventh transistor, wherein one of a source and a drain of the seventh transistor is electrically connected to one end of the first inductor, another one of the source and the drain of the seventh transistor is electrically connected to the light-emitting element, and a gate of the seventh transistor is electrically connected to an eighth output of the control circuit.

In some embodiments, the clamp branch comprises: a fifth transistor, wherein one of a source and a drain of the fifth transistor is electrically connected to the input terminal of the grayscale adjustment circuit and a gate of the fifth transistor is electrically connected to a fourth output terminal of the control circuit; a fourth resistor, wherein one end of the fourth resistor is electrically connected to another one of the source and the drain of the fifth transistor and another end of the fifth resistor is electrically connected to a fifth output terminal of the control circuit; and a fifth resistor, wherein one end of the fifth resistor is electrically connected to another end of the fourth resistor, and another end of the fifth resistor is grounded.

In some embodiments, the clamp branch comprises: a fifth transistor, wherein one of a source and a drain of the fifth transistor is electrically connected to the input terminal of the grayscale adjustment circuit and a gate of the fifth transistor is electrically connected to a sixth output terminal of the control circuit; a fourth resistor, wherein one end of the fourth resistor is electrically connected to another one of the source and the drain electrode of the fifth transistor and another end of the fourth resistor is electrically connected to a fifth output terminal of the control circuit; and a fifth resistor, wherein one end of the fifth resistor is electrically connected to another end of the fourth resistor, and another end of the fifth resistor is grounded.

In a second aspect, the present disclosure provides a display panel, comprising the pixel circuit of at least one of the above embodiments.

In the pixel circuit and the display panel provided by the present disclosure, a corresponding power supply voltage can be provided for the light-emitting element through the driving circuit, and the control circuit can control at least one of the at least two gray-scale adjustment branches to be in a conductive state, and the corresponding power supply voltage can be provided with the gray-scale adjustment branch. With the increase of the conduction number of the branches, the light-emitting current flowing through the light-emitting element also increases; at the same time, the control circuit can control at least two grayscale adjustment branches to be in a disconnected state, so as to control the light-emitting time of the light-emitting element, so that the pixel circuit and the display panel have a function of dynamic dimming, and then the brightness display can be uniformly adjusted as required.

DETAILED DESCRIPTION OF EMBODIMENTS

In order to make the purposes, technical solutions and effects of the present disclosure more clear, the following describes the present disclosure in detail with reference to the accompanying drawings and examples. It should be understood that the specific embodiments described herein are intended to explain the present disclosure only and are not intended to limit the present disclosure.

With respect to a technical problem that a technical problem that luminance display of a pixel circuit in the conventional technical solutions is not uniform due to dynamic dimming. This embodiment provides a pixel circuit which includes a light-emitting element 500, a driving circuit 100, a grayscale adjustment circuit 300, and a control circuit 400. The grayscale adjustment circuit 300 includes at least two grayscale adjustment branches connected in parallel, input terminals of the at least two grayscale adjustment branches are electrically connected to an output terminal of the driving circuit 100, and output terminals of the at least two grayscale adjustment branches are electrically connected to the light-emitting element 500. Output terminals of the control circuit 400 are electrically connected to control terminals of the at least two grayscale adjustment branches for controlling the turn-on and turn-off of the at least two grayscale adjustment branches respectively.

It will be understood that the pixel circuit provided in this embodiment can provide a corresponding power supply voltage to the light-emitting element 500 through the driving circuit 100, and the control circuit 400 can control at least one of the at least two gray-scale adjustment branches to be in a conductive state, and light-emitting current flowing through the light-emitting element 500 increases as the number of the grayscale adjustment branches is increased. At the same time, the control circuit 400 can control the at least two grayscale adjustment branches to be in an off state, so that light-emitting time of the light-emitting element 500 can be controlled, so that the pixel circuit and the display panel have the function of dynamic dimming, and further, the brightness display can be uniformly adjusted as necessary.

The light-emitting element 500 may be any one of a mini light-emitting diode, a micro light-emitting diode, an organic light-emitting diode, and a quantum dot light-emitting diode.

It should be noted that the control circuit 400 can automatically control the conduction number of the grayscale adjustment branch according to the grayscale change to control the display brightness of each pixel circuit uniformly.

Figure 2:
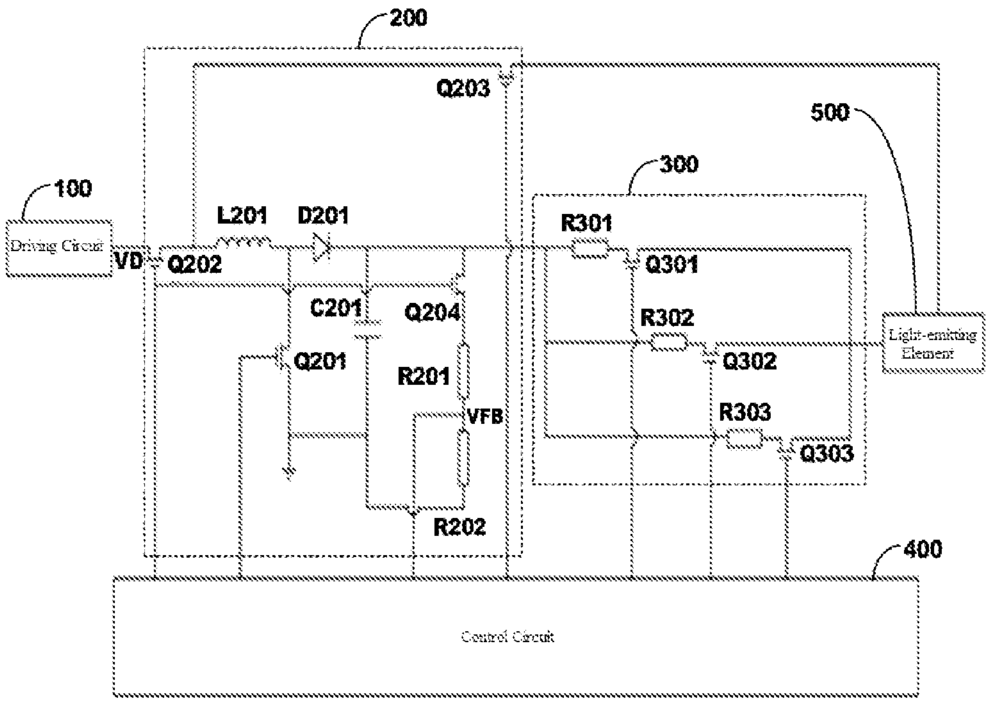
FIG. 2 is a second schematic structural diagram of a pixel circuit according to an embodiment of the present disclosure.
Figure 3:
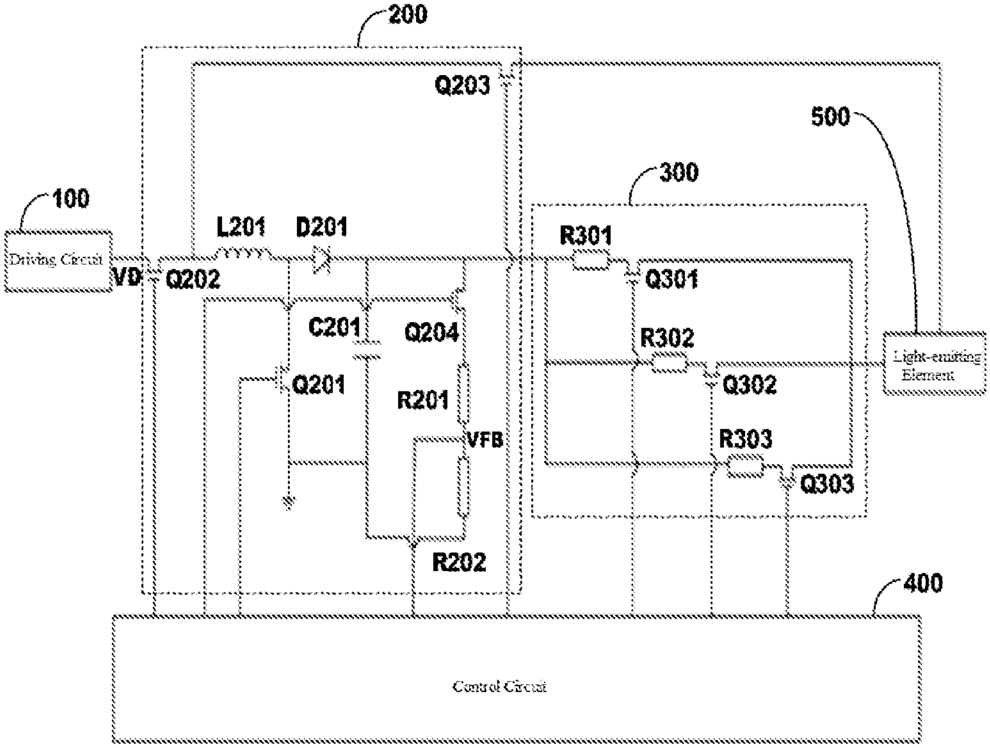
FIG. 3 is a third schematic structural diagram of a pixel circuit according to an embodiment of the present disclosure.

In one embodiment, as shown in FIG. 2 or FIG. 3, the grayscale adjustment circuit 300 includes a first grayscale adjustment branch and a second grayscale adjustment branch. An input terminal of the first grayscale adjustment branch is electrically connected to an output terminal of the driving circuit 100, an output terminal of the first grayscale adjustment branch is electrically connected to the light-emitting element 500, and a control terminal of the first grayscale adjustment branch is electrically connected to a first output terminal of the control circuit 400. An input terminal of the second grayscale adjustment branch is electrically connected to the input terminal of the first grayscale adjustment branch, an output terminal of the second grayscale adjustment branch is electrically connected to the output terminal of the first grayscale adjustment branch, and a control terminal of the second grayscale adjustment branch is electrically connected to a second output terminal of the control circuit 400.

It should be noted that, in this embodiment, the first grayscale adjustment branch is connected in parallel with the second grayscale adjustment branch, and by controlling the first grayscale adjustment branch and/or the second grayscale adjustment branch to be in a conductive state, three different light-emitting currents can be supplied to the light-emitting element 500. For example, when only the first grayscale adjustment branch is in a conductive state, a first light-emitting current can be supplied to the light-emitting element 500. When only the second grayscale adjustment branch is in a conductive state, a second light-emitting current can be supplied to the light-emitting element 500. When both the first grayscale adjustment branch and the second grayscale adjustment branch are in the conductive state, a third light-emitting current may be supplied to the light-emitting element 500. The first light-emitting current may be the same as the second light-emitting current. By simultaneously disconnecting the first grayscale adjustment branch and the second grayscale adjustment branch, the emission time of the light-emitting element 500 can be controlled.

In one embodiment, as shown in FIG. 2 or FIG. 3, the grayscale adjustment circuit 300 further includes a third grayscale adjustment branch, an input terminal of the third grayscale adjustment branch is electrically connected to the input terminal of the second grayscale adjustment branch, an output terminal of the third grayscale adjustment branch is electrically connected to the output terminal of the second grayscale adjustment branch, and a control terminal of the third grayscale adjustment branch is electrically connected to the third output terminal of the control circuit 400.

It should be noted that in this embodiment, the third grayscale adjustment branch is added, and when the third grayscale adjustment branch is combined with the conduction state of the first grayscale adjustment branch and the second grayscale adjustment branch, more different light-emitting currents can be provided for the light-emitting element 500, and more display brightness adjustment needs can be met. It will be understood that a plurality of third grayscale adjustment branches may be provided according to requirements for providing more different light-emitting currents for the light-emitting element 500, so that more display brightness adjustment needs can be met.

In one of the embodiments, as shown in FIG. 2 or FIG. 3, the first grayscale adjustment branch includes a first resistor R301 and a first transistor Q301, one end of the first resistor R301 is electrically connected to an output terminal of the driving circuit 100, another end of the first resistor R301 is electrically connected to one of a source and a drain of the first transistor Q301, a gate of the first transistor Q301 is electrically connected to the first output terminal of the control circuit 400, and another one of the source and the drain of the first transistor Q301 is electrically connected to the light-emitting element 500.

It should be noted that by adjusting a resistance value of the first resistor R301, the light-emitting current output to the light-emitting element 500 can be changed, and the grayscale display of the light-emitting element 500 can be adjusted. By adjusting the on-time of the first transistor Q301, the light-emitting time of the light-emitting element 500 can be changed, and the corresponding grayscale display can also be realized.

In one of the embodiments, as shown in FIG. 2 or FIG. 3, the second grayscale adjustment branch includes a second resistor R302 and a second transistor Q302, one end of the second resistor R302 is electrically connected to one end of the first resistor R301, another end of the second resistor R302 is electrically connected to one of a source and a drain of the second transistor Q302, a gate of the second transistor Q302 is electrically connected to the second output terminal of the control circuit 400, and another one of the source and the drain of the second transistor Q302 is electrically connected to another one of the source and the drain of the first transistor Q301.

It should be noted that by adjusting a resistance value of the second resistor R302, the light-emitting current output to the light-emitting element 500 can be changed, and the grayscale display of the light-emitting element 500 can be adjusted. By adjusting the on-time of the second transistor Q302, the light-emitting time of the light-emitting element 500 can be changed, and the corresponding grayscale display can also be realized.

In one embodiment, as shown in FIG. 2 or FIG. 3, the third grayscale adjustment branch includes a third resistor R303 and a third transistor Q303, one end of the third resistor R303 is electrically connected to one end of the first resistor R301, another end of the third resistor R303 is electrically connected to one of a source and a drain of the third transistor Q303, a gate of the third transistor Q303 is electrically connected to the third output terminal of the control circuit 400, and another one of the source and the drain of the third transistor Q303 is electrically connected to another one of the source and the drain of the first transistor Q301.

It should be noted that by adjusting a resistance value of the third resistor R303, the light-emitting current output to the light-emitting element 500 can be changed, and the grayscale display of the light-emitting element 500 can be adjusted. By adjusting the on-time of the third transistor Q303, the light emission time of the light-emitting element 500 can be changed, and the corresponding grayscale display can also be realized.

Figure 1:
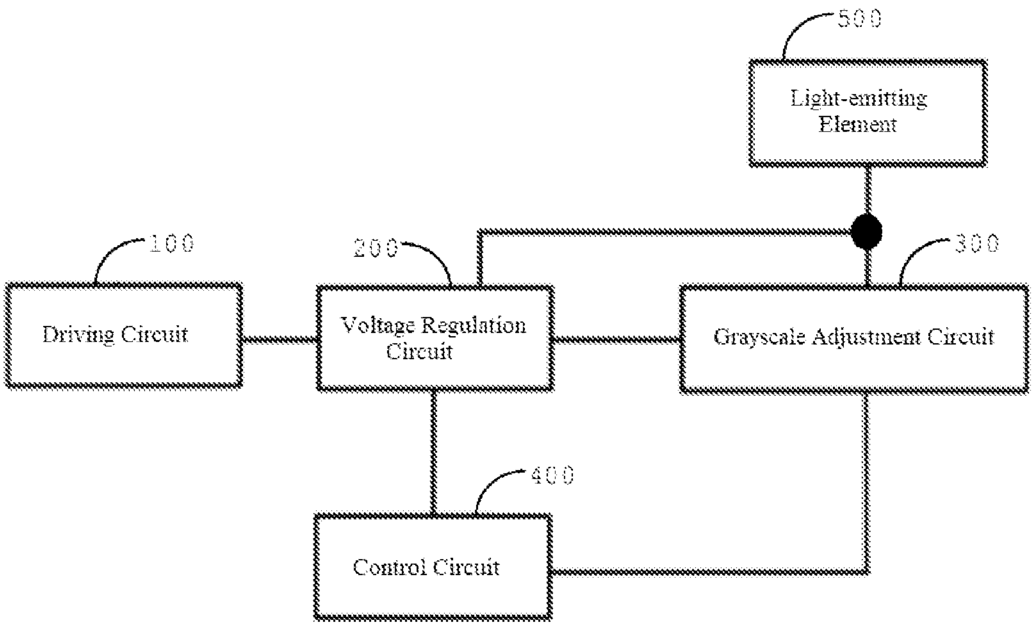
FIG. 1 is a first schematic structural diagram of a pixel circuit according to an embodiment of the present disclosure.

Since an actual output current of the driving circuit 100 or the driving chip is different from a theoretical current value, the light-emitting element 500 in a single pixel circuit have a certain half-wave width and optical attenuation, and the deviation of full-color display may occur. At the same time, since the output point of the power supply voltage for the light-emitting elements 500 is different from the input point of each light-emitting element 500, the voltages at both ends of the different light-emitting elements 500 may be different, and the light-emitting currents flowing through the different light-emitting elements 500 may be different. Usually, the farther the place is (the greater the resistance), the more obvious the current drop, and the more the brightness of the light-emitting element 500 drops, resulting in uneven brightness. In view of this, in one embodiment, as shown in FIG. 1, the pixel circuit further includes a voltage regulation circuit 200, an input terminal of the voltage regulation circuit 200 is electrically connected to an output terminal of the driving circuit 100, an output terminal of the voltage regulation circuit 200 is electrically connected to the grayscale adjustment circuit 300 and/or the light-emitting element 500, and a control terminal of the voltage regulation circuit 200 is electrically connected to the output terminal of the control circuit 400.

It is understood that in this embodiment, an anode voltage output to the light-emitting element 500 can be adjusted by the voltage regulation circuit 200 to compensate for the voltage drop loss on the transmission path, thereby obtaining an ideal voltage at both ends of the light-emitting element 500 and realizing a preset grayscale display.

It should be noted that the voltage regulation circuit 200 may be provided with the number of boost branches and/or step-down branches and the combination relationship as necessary to realize the voltage regulation requirement of the pixel circuit.

In one embodiment, the voltage regulation circuit 200 includes a boost branch and a clamp branch, an input terminal of the boost branch is electrically connected to the output of the driving circuit 100, an output terminal of the boost branch is electrically connected to an input terminal of the clamp branch, and an output terminal of the clamp branch is electrically connected to the input terminal of the grayscale adjustment circuit 300.

In one embodiment, as shown in FIG. 2 or FIG. 3, the boost branch includes a fourth transistor Q202, a first diode D201, a first capacitor C201, a first inductor L201, a sixth transistor Q201, and a seventh transistor Q203. One of a source and a drain of the fourth transistor Q202 is electrically connected to the output terminal of the driving circuit 100, and the gate of the fourth transistor Q202 is electrically connected to the fourth output terminal of the control circuit 400. One end of the first inductor L201 is electrically connected to another one of the source and the drain of the fourth transistor Q202; an anode of the first diode D201 is electrically connected to another end of the first inductor L201; one end of the first capacitor C201 is electrically connected to a cathode of the first diode D201, and another end of the first capacitor C 201 is grounded; one of a source and a drain of the sixth transistor Q1 is electrically connected to another end of the first inductor L1, another one of the source and the drain of the sixth transistor Q1 is grounded, and a gate of the sixth transistor Q1 is electrically connected to a seventh output of the control circuit 400; one of a source and a drain of the seventh transistor Q203 is electrically connected to one end of the first inductor L201, another one of the source and the drain of the seventh transistor Q203 is electrically connected to the light-emitting element 500, and a gate of the seventh transistor Q203 is electrically connected to an eighth output terminal of the control circuit 400.

It should be noted that operating process of the above boost branch can be as follows: First, the sixth transistor Q201 is turned on, and the driving circuit 100 charges the first inductor L201. Then, the sixth transistor Q201 is turned off, the first inductor L201 generates a reverse electromotive force, the voltage is boosted, and the first capacitor C201 is charged. At this time, the charge charged by the first capacitor C201 is greater than the voltage input by the driving circuit 100. In other embodiments, the circuit configuration of the boost branch is substantially similar to that of the above-described embodiment except that the boost branch of the other embodiment does not include at least one of the fourth transistor Q202 and the seventh transistor Q203.

In one of the embodiments, as shown in FIG. 2, the clamp branch includes a fifth transistor Q204, a fourth resistor R201, and a fifth resistor R202, one of a source and a drain of the fifth transistor Q204 is electrically connected to the cathode of the first diode D201, and a gate of the fifth transistor Q204 is electrically connected to a fourth output of the control circuit 400; one end of the fourth resistor R201 is electrically connected to another one of the source and the drain of the fifth transistor Q204, and another end of the fourth resistor R201 is electrically connected to a fifth output terminal of the control circuit 400; one end of the fifth resistor R202 is electrically connected to another end of the fourth resistor R201, and another end of the fifth resistor R202 is grounded.

It should be noted that the operation of the clamp branch may be such that the fifth output terminal of the control circuit 400 provides a constant potential for the clamp branch, and then the fifth transistor Q204 is turned on under the control of the fourth output terminal of the control circuit 400. In this case, the output potential of the voltage regulation circuit 200 may be stabilized or clamped through the fourth resistor R201 and the fifth resistor R202.

In one of the embodiments, as shown in FIG. 3, the clamp branch includes the fifth transistor Q204, the fourth resistor R201, and the fifth resistor R202, one of the source and the drain of the fifth transistor Q204 is electrically connected to the cathode of the first diode D201, and the gate of the fifth transistor Q204 is electrically connected to the sixth output terminal of the control circuit 400; one end of the fourth resistor R201 is electrically connected to another one of the source and the drain of the fifth transistor Q204, and another end of the fourth resistor R201 is electrically connected to the fifth output terminal of the control circuit 400; one end of the fifth resistor R202 is electrically connected to another end of the fourth resistor R201, and another end of the fifth resistor R202 is grounded. In other embodiments, the circuit structure of the clamp branch is similar to that of the above-described embodiment except that the clamp branch of this embodiment does not include the fifth transistor Q204.

It should be noted that the operation principle of the voltage regulation circuit 200 may be as follows:

First, when the fourth transistor Q202 and the fifth transistor Q204 in the voltage regulation circuit 200 are turned on and the sixth transistor Q201 is turned off, the driving circuit 100 charges the first inductor L201 and the first capacitor C201. At the same time, the required output voltage Vout=VFB*(R201+R202)/R202 is supplied to the grayscale adjustment circuit 300. Wherein VFB is a voltage supplied to another end of the fourth resistor R4 at the fifth output terminal of the control circuit 400 for supplying a clamp voltage to the voltage regulation circuit 200; R201 is used here to characterize the resistance value of the fourth resistance R201; R202 is used here to characterize the resistance value of the fifth resistance R202. It will be understood that the output voltage Vout is in an appropriate range by adjusting the resistance value of the fourth resistor R201 and the resistance value of the fifth resistor R202.

Then, when the sixth transistor Q201 in the voltage regulation circuit 200 is turned on, the driving circuit 100 charges the first inductor L201. Meanwhile, the first capacitor C201 is discharged to supply a light-emitting current to the light-emitting element 500 through the grayscale adjustment circuit 300. At this time, the light emission time of the light-emitting element 500 is controlled by controlling the off-time of at least one of the first transistor Q301, the second transistor Q302, and the third transistor Q303 by the control circuit 400. It will be understood that the first transistor Q301, the second transistor Q302, and the third transistor Q303 may provide the maximum light-emitting current Iout to the light-emitting element 500 when simultaneously turned on.

A light-emitting current Iout=Vout/(Rx+Ro), wherein Rx is an equivalent resistance of at least one of the first resistor R301, the second resistor R302, and the third resistor R303, and Ro is an equivalent resistance of the light-emitting element 500.

In one of the embodiments, the fifth transistor Q204 and the sixth transistor Q201 are turned off within the same time T. The time T is divided into a time period T1 and a time period T2. In the time period T1, the fourth transistor Q202 is turned on, the output voltage VD of the driving circuit 100 is charged by the first inductor L201 and the first capacitor C201. During the time period T2, the fourth transistor Q202 is turned off, the seventh transistor Q203 is turned on, and the first inductor L201 and the first capacitor C201 respectively provide the light-emitting current to the light-emitting element 500 through corresponding loops. It will be understood that in this process, since the first inductor L1 is not discharged through the sixth transistor Q201, current can be saved.

In one of the embodiments, this embodiment provides a display panel including pixel circuits in at least one of the embodiments described above.

It will be understood that the display panel provided in this embodiment can provide a corresponding power supply voltage to the light-emitting element 500 through the driving circuit 100, and the control circuit 400 can control at least one of the at least two gray-scale adjustment branches to be in a conductive state, and the light-emitting current flowing through the light-emitting element 500 increases as the number of the grayscale adjustment branches is increased. At the same time, the control circuit 400 can control at least two grayscale adjustment branches to be in the off state, so that the light-emitting time of the light-emitting element 500 can be controlled, so that the pixel circuit and the display panel have the function of dynamic dimming, and further, the brightness display can be uniformly adjusted as necessary.

It will be understood that those skilled in the art may make equivalent replacements or changes in accordance with the technical solutions of the present application and the inventive concepts thereof, all of which shall fall within the scope of the claims appended hereto.

What is claimed is:

1. A pixel circuit, comprising:

a light-emitting element;

a driving circuit;

a grayscale adjustment circuit including at least two grayscale adjustment branches connected in parallel, wherein input terminals of the at least two grayscale adjustment branches are electrically connected to output terminals of the driving circuit, and output terminals of the at least two grayscale adjustment branches are electrically connected to the light-emitting element; and a control circuit, wherein output terminals of the control circuit are electrically connected to control terminals of the at least two grayscale adjustment branches for controlling turn-on and turn-off of the at least two grayscale adjustment branches respectively;

wherein the grayscale adjustment circuit comprises:

a first grayscale adjustment branch, wherein an input terminal of the first grayscale adjustment branch is electrically connected to an output terminal of the driving circuit, an output terminal of the first grayscale adjustment branch is electrically connected to the light-emitting element, and a control terminal of the first grayscale adjustment branch is electrically connected to a first output terminal of the control circuit; and a second grayscale adjustment branch, wherein an input terminal of the second grayscale adjustment branch is electrically connected to the input terminal of the first grayscale adjustment branch, an output terminal of the second grayscale adjustment branch is electrically connected to the output terminal of the first grayscale adjustment branch, and a control terminal of the second grayscale adjustment branch is electrically connected to a second output terminal of the control circuit.

2. The pixel circuit according to claim 1, wherein the grayscale adjustment circuit further comprises a third grayscale adjustment branch connected to the first grayscale adjustment branch and the second grayscale adjustment branch, an input terminal of the third grayscale adjustment branch is electrically connected to the input terminal of the second grayscale adjustment branch, an output terminal of the third grayscale adjustment branch is electrically connected to the output terminal of the second grayscale adjustment branch, and a control terminal of the third grayscale adjustment branch is electrically connected to a third output terminal of the control circuit.

3. The pixel circuit according to claim 1, wherein each of the grayscale adjustment branches comprises a resistor and a transistor, one end of the resistor is electrically connected to an output terminal of the driving circuit, another end of the resistor is electrically connected to one of a source and a drain of the transistor, a gate of the transistor is electrically connected to a corresponding output terminal of the control circuit, and another one of the source and the drain of the transistor is electrically connected to the light-emitting element.

4. The pixel circuit according to claim 1, wherein the pixel circuit further comprises a voltage regulation circuit electrically connected to an output terminal of the driving circuit, an input terminal of the grayscale adjustment circuit, and the light-emitting element, and a control terminal of the voltage regulation circuit is electrically connected to an output terminal of the control circuit.

5. The pixel circuit according to claim 4, wherein the voltage regulation circuit comprises a boost branch and a clamp branch, an input terminal of the boost branch is electrically connected to the output terminal of the driving circuit, an output terminal of the boost branch is electrically connected to an input terminal of the clamp branch, and an output terminal of the clamp branch is electrically connected to an input terminal of the grayscale adjustment circuit.

6. The pixel circuit according to claim 5, wherein the boost branch comprises:

a fourth transistor, wherein one of a source and a drain of the fourth transistor is electrically connected to the output terminal of the driving circuit and a gate of the fourth transistor is electrically connected to a fourth output terminal of the control circuit;

a first inductor, wherein one end of the first inductor is electrically connected to another one of the source and the drain of the fourth transistor;

a first diode, wherein an anode of the first diode is electrically connected to another end of the first inductor;

a first capacitor, wherein one end of the first capacitor is electrically connected to a cathode of the first diode, and another end of the first capacitor is grounded;

a sixth transistor, wherein one of a source and a drain of the sixth transistor is electrically connected to another end of the first inductor, another one of the source and the drain of the sixth transistor is grounded, and a gate of the sixth transistor is electrically connected to a seventh output of the control circuit; and a seventh transistor, wherein one of a source and a drain of the seventh transistor is electrically connected to one end of the first inductor, another one of the source and the drain of the seventh transistor is electrically connected to the light-emitting element, and a gate of the seventh transistor is electrically connected to an eighth output of the control circuit.

7. The pixel circuit according to claim 5, wherein the clamp branch comprises:

a fifth transistor, wherein one of a source and a drain of the fifth transistor is electrically connected to the input terminal of the grayscale adjustment circuit and a gate of the fifth transistor is electrically connected to a fourth output terminal of the control circuit;

a fourth resistor, wherein one end of the fourth resistor is electrically connected to another one of the source and the drain of the fifth transistor and another end of the fifth resistor is electrically connected to a fifth output terminal of the control circuit; and a fifth resistor, wherein one end of the fifth resistor is electrically connected to another end of the fourth resistor, and another end of the fifth resistor is grounded.

8. The pixel circuit according to claim 5, wherein the clamp branch comprises:

a fifth transistor, wherein one of a source and a drain of the fifth transistor is electrically connected to the input terminal of the grayscale adjustment circuit and a gate of the fifth transistor is electrically connected to a sixth output terminal of the control circuit;

a fourth resistor, wherein one end of the fourth resistor is electrically connected to another one of the source and the drain electrode of the fifth transistor and another end of the fourth resistor is electrically connected to a fifth output terminal of the control circuit; and a fifth resistor, wherein one end of the fifth resistor is electrically connected to another end of the fourth resistor, and another end of the fifth resistor is grounded.

9. A display panel, comprising the pixel circuit of claim 1, wherein the light-emitting element is one of a mini light-emitting diode, a micro light-emitting diode, an organic light-emitting diode, or a quantum dot light-emitting diode.

10. The display panel according to claim 9, wherein the grayscale adjustment circuit further comprises a third grayscale adjustment branch connected to the first grayscale adjustment branch and the second grayscale adjustment branch, an input terminal of the third grayscale adjustment branch is electrically connected to the input terminal of the second grayscale adjustment branch, an output terminal of the third grayscale adjustment branch is electrically connected to the output terminal of the second grayscale adjustment branch, and a control terminal of the third grayscale adjustment branch is electrically connected to a third output terminal of the control circuit.

11. The display panel according to claim 9, wherein each of the grayscale adjustment branches comprises a resistor and a transistor, one end of the resistor is electrically connected to an output terminal of the driving circuit, another end of the resistor is electrically connected to one of a source and a drain of the transistor, a gate of the transistor is electrically connected to a corresponding output terminal of the control circuit, and another one of the source and the drain of the transistor is electrically connected to the light-emitting element.

12. The display panel according to claim 9, wherein the pixel circuit further comprises a voltage regulation circuit electrically connected to an output terminal of the driving circuit, an input terminal of the grayscale adjustment circuit, and the light-emitting element, and a control terminal of the voltage regulation circuit is electrically connected to an output terminal of the control circuit.

13. The display panel according to claim 12, wherein the voltage regulation circuit comprises a boost branch and a clamp branch, an input terminal of the boost branch is electrically connected to the output terminal of the driving circuit, an output terminal of the boost branch is electrically connected to an input terminal of the clamp branch, and an output terminal of the clamp branch is electrically connected to the input terminal of the grayscale adjustment circuit.

14. The display panel according to claim 13, wherein the boost branch comprises:

a fourth transistor, wherein one of a source and a drain of the fourth transistor is electrically connected to the output terminal of the driving circuit and a gate of the fourth transistor is electrically connected to a fourth output terminal of the control circuit;

a first inductor, wherein one end of the first inductor is electrically connected to another one of the source and the drain of the fourth transistor;

a first diode, wherein an anode of the first diode is electrically connected to another end of the first inductor;

a first capacitor, wherein one end of the first capacitor is electrically connected to a cathode of the first diode, and another end of the first capacitor is grounded;

a sixth transistor, wherein one of a source and a drain of the sixth transistor is electrically connected to another end of the first inductor, another one of the source and the drain of the sixth transistor is grounded, and a gate of the sixth transistor is electrically connected to a seventh output of the control circuit; and a seventh transistor, wherein one of a source and a drain of the seventh transistor is electrically connected to one end of the first inductor, another one of the source and the drain of the seventh transistor is electrically connected to the light-emitting element, and a gate of the seventh transistor is electrically connected to an eighth output of the control circuit.

15. The display panel according to claim 14, wherein the clamp branch comprises:

a fifth transistor, wherein one of a source and a drain of the fifth transistor is electrically connected to an input terminal of the grayscale adjustment circuit and a gate of the fifth transistor is electrically connected to a fourth output terminal of the control circuit;

a fourth resistor, wherein one end of the fourth resistor is electrically connected to another one of the source and the drain of the fifth transistor, and another end of the fourth resistor is electrically connected to a fifth output terminal of the control circuit; and a fifth resistor, wherein one end of the fifth resistor is electrically connected to another end of the fourth resistor, and another end of the fifth resistor is grounded.

16. The display panel according to claim 15, wherein the fourth transistor is turned on, and the fifth transistor, the sixth transistor, and the seventh transistor are turned off in one of the time periods.

17. The display panel according to claim 13, wherein the clamp branch comprises:

a fifth transistor, wherein one of a source and a drain of the fifth transistor is electrically connected to the input terminal of the grayscale adjustment circuit and a gate of the fifth transistor is electrically connected to a sixth output terminal of the control circuit;

a fourth resistor, wherein one end of the fourth resistor is electrically connected to another one of the source and the drain of the fifth transistor and another end of the fourth resistor is electrically connected to the fifth output terminal of the control circuit; and a fifth resistor, wherein one end of the fifth resistor is electrically connected to another end of the fourth resistor, and another end of the fifth resistor is grounded.

18. The display panel according to claim 17, wherein the fourth transistor, the fifth transistor, and the sixth transistor are turned off and the seventh transistor is turned on in another time period.

19. A pixel circuit, comprising:

a light-emitting element;

a driving circuit;

a grayscale adjustment circuit including at least two grayscale adjustment branches connected in parallel, wherein input terminals of the at least two grayscale adjustment branches are electrically connected to output terminals of the driving circuit, and output terminals of the at least two grayscale adjustment branches are electrically connected to the light-emitting element; and a control circuit, wherein output terminals of the control circuit are electrically connected to control terminals of the at least two grayscale adjustment branches for controlling turn-on and turn-off of the at least two grayscale adjustment branches respectively;

wherein each of the grayscale adjustment branches comprises a resistor and a transistor, one end of the resistor is electrically connected to an output terminal of the driving circuit, another end of the resistor is electrically connected to one of a source and a drain of the transistor, a gate of the transistor is electrically connected to a corresponding output terminal of the control circuit, and another one of the source and the drain of the transistor is electrically connected to the light-emitting element.

20. A pixel circuit, comprising:

a light-emitting element;

a driving circuit;

a grayscale adjustment circuit including at least two grayscale adjustment branches connected in parallel, wherein input terminals of the at least two grayscale adjustment branches are electrically connected to output terminals of the driving circuit, and output terminals of the at least two grayscale adjustment branches are electrically connected to the light-emitting element; and a control circuit, wherein output terminals of the control circuit are electrically connected to control terminals of the at least two grayscale adjustment branches for controlling turn-on and turn-off of the at least two grayscale adjustment branches respectively;

wherein the pixel circuit further comprises a voltage regulation circuit electrically connected to an output terminal of the driving circuit, an input terminal of the grayscale adjustment circuit, and the light-emitting element, and a control terminal of the voltage regulation circuit is electrically connected to an output terminal of the control circuit.

* * * * *